United States Patent  
Bortoli et al.

(10) Patent No.: US 10,364,886 B2
(45) Date of Patent: Jul. 30, 2019

(54) HYDROSTATIC AND DIRECT DRIVE TRANSMISSION

(71) Applicant: DANA ITALIA S.R.L., Arco (TN) (IT)

(72) Inventors: Andrea Bortoli, Trento (IT); Ettore Cosoli, Padua (IT); Giulio Ornella, Arco (IT); Lorenzo Serrao, Nago-Torbole (IT)

(73) Assignee: Dana Italia S.R.L., Arco (TN) (IT)

( * ) Notice: Subject to any disclaimer, the term of this patent is extended or adjusted under 35 U.S.C. 154(b) by 0 days.

(21) Appl. No.: 15/557,857

(22) PCT Filed: Mar. 11, 2016

(86) PCT No.: PCT/EP2016/055361
§ 371 (c)(1),
(2) Date: Sep. 13, 2017

(87) PCT Pub. No.: WO2016/146545
PCT Pub. Date: Sep. 22, 2016

(65) Prior Publication Data
US 2018/0073633 A1 Mar. 15, 2018

Related U.S. Application Data

(60) Provisional application No. 62/132,721, filed on Mar. 13, 2015.

(30) Foreign Application Priority Data

Mar. 13, 2015 (IT) .................. 102015902338142

(51) Int. Cl.
*F16H 61/40* (2010.01)
*F16H 61/44* (2006.01)
*F16H 47/02* (2006.01)

(52) U.S. Cl.
CPC ............. *F16H 61/44* (2013.01); *F16H 47/02* (2013.01); *F16H 61/40* (2013.01); *F16H 2047/025* (2013.01)

(58) Field of Classification Search
CPC .......... F16H 61/40; F16H 61/44; F16H 47/02; F16H 2047/025; B60K 17/28; B60K 17/10; B60K 17/356
See application file for complete search history.

(56) References Cited

U.S. PATENT DOCUMENTS 4,304,151 A  12/1981 Meyerle et al.
7,178,334 B2 *  2/2007 Beck .................... B60K 17/356
                                                        180/308

(Continued)

FOREIGN PATENT DOCUMENTS

EP     2264334 A1  12/2010
WO  2014/122322 A1   8/2014

(Continued)

OTHER PUBLICATIONS

Italian Patent and Trademark Office, Search Report, with English translation, issued in IT priority IT102015902338142 (ITRM20150106), dated Nov. 11, 2015, 10 pages, European Patent Office acting as the search division for the IPTO, Munich, Germany.

(Continued)

*Primary Examiner* — Erez Gurari
(74) *Attorney, Agent, or Firm* — Marshall & Melhorn, LLC

(57) ABSTRACT

A hydrostatic driveline has a power source and a hydrostatic pump in driving engagement with the power source; a primary driveline shaft in driving engagement with the power source. The driveline also has a first transmission portion and a second transmission portion in driving engagement with the first transmission portion. A hydrostatic motor is in fluid communication with the hydrostatic pump and is (Continued)

in driving engagement with the first transmission portion. A vehicle output is in driving engagement with the second transmission portion. The primary driveline shaft is also in driving engagement with the second transmission portion. The hydrostatic driveline may be operated in a hydrostatic mode or in a direct drive mode using the primary driveline shaft and the second transmission portion.

12 Claims, 4 Drawing Sheets

(56) References Cited

U.S. PATENT DOCUMENTS

| | | | | |
|---|---|---|---|---|
| 7,686,737 | B2* | 3/2010 | Nishi | F16H 61/423 477/115 |
| 8,532,888 | B2* | 9/2013 | Ishibashi | E02F 9/202 477/110 |
| 8,667,865 | B2* | 3/2014 | Hoyle | B60K 17/35 74/665 A |
| 8,857,172 | B2* | 10/2014 | Prigent | B60K 17/356 60/413 |
| 9,033,077 | B2* | 5/2015 | Kurkinen | F04B 17/05 180/65.21 |
| 9,441,679 | B2* | 9/2016 | Heindl | F16D 23/06 |
| 9,494,222 | B2* | 11/2016 | Versteyhe | B60K 17/10 |
| 9,597,959 | B2 | 3/2017 | Versteyhe | |
| 9,816,534 | B2* | 11/2017 | Krittian | F15B 1/027 |
| 2016/0076633 | A1 | 3/2016 | Nellums et al. | |

FOREIGN PATENT DOCUMENTS

| | | |
|---|---|---|
| WO | 2014/122323 A1 | 8/2014 |
| WO | 2014/167130 A1 | 10/2014 |

OTHER PUBLICATIONS

European Patent Office, International Search Report and Written Opinion, issued in international application No. PCT/EP2016/055361, dated Jun. 7, 2016, 11 pages, European Patent Office, Rijswijk, Netherlands.

* cited by examiner

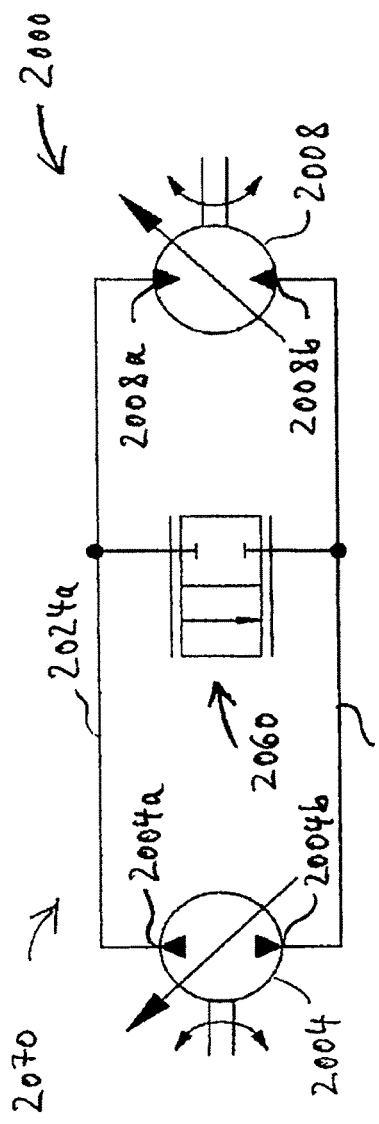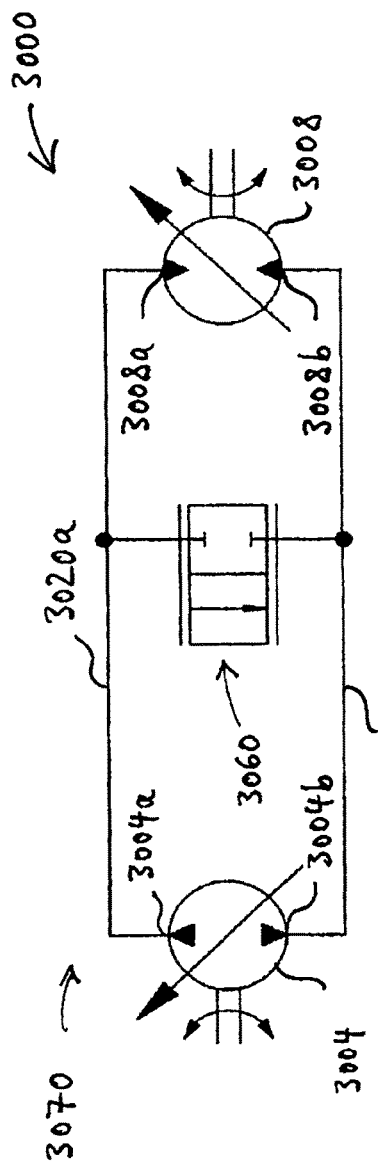

HYDROSTATIC AND DIRECT DRIVE TRANSMISSION

The present invention relates to hydrostatic drivelines and more specifically to hydrostatic drivelines having a direct drive capability. The present application claims priority to Italian patent application No. 10 2015 902 338 142 filed on Mar. 13, 2015 and to U.S. provisional patent application No. 62/132,721 filed on Mar. 13, 2015 both of which are incorporated herein by reference in their entirety.

FIELD OF THE INVENTION

Background Of The Invention

Hydrostatic transmissions use a hydraulic fluid to transmit power from a power source (for example, an internal combustion engine) to a power output (for example, a final drive or a plurality of wheels). Hydrostatic transmissions are typically used in agricultural tractors and other off-highway equipment, for example, forklifts, excavators, earth moving machines, and other vehicles.

The major benefits of hydrostatic transmissions are a large range of continuously variable speed, a precise control of traction effort and speed, and high maneuverability. Each of these benefits is directly related to vehicle productivity. Other advantages include high power capability in a compact size, a fast response related to low inertia, maintaining a controlled speed regardless of load, high traction force at a low engine speed, flexibility in packaging, dynamic braking, and simplicity in reversing vehicle direction. Compared to traditional solutions, such as a hydrodynamic transmission with a torque converter, hydrostatic transmissions can provide improved performance. As a non-limiting example, a wheel loader application may require high maneuverability and a wide torque and speed conversion range.

Hydrostatic transmissions are not without their drawbacks, however. Hydrostatic transmissions tend to have a lower overall efficiency, increased maintenance costs, and increased initial investment cost compared to conventional gear transmissions. As a result, design considerations for a given application in a hydrostatic transmission are very important. As a non-limiting example, a hydrostatic transmission design can focus on one or more particular operating modes, such as low speed driving to provide maximum tractive effort, variable speed operation, or maximum speed operation. Focusing a design on an operating mode, will increase an overall efficiency of the transmission and proper sizing of transmission components will result in a more cost-effective solution.

A hydrostatic driveline can be divided into many standard categories based on the characteristics of the hydraulic pump and the hydraulic motor. The hydrostatic driveline can include a fixed displacement pump or a variable displacement pump and a fixed displacement motor or a variable displacement motor. A common combination amongst hydrostatic drivelines is a driveline configures with a variable displacement pump and a fixed displacement motor. In this combination, an output speed is controlled by varying a displacement of the pump.

To increase versatility of a hydrostatic driveline, such as including a high output capacity and a wide velocity of operational ranges, many alternative concepts of hydrostatic drivelines have been developed to meet such demands. One of the simplest and most common solutions is to use the hydrostatic transmission with a mechanical gearbox connected in series, and is shown in FIG. 1. A hydrostatic driveline 1000 includes a power source 1002 in driving engagement with a hydrostatic pump 1004. The hydrostatic pump 1004 is in fluid communication with a hydrostatic motor 1006. The hydrostatic motor 1006 is in driving engagement with a transmission 1008, which is in driving engagement with a vehicle output 1010.

It would be advantageous to develop a hydrostatic driveline that includes a direct drive capability, which offers the benefits of increased efficiency at a high speed operating mode while maintaining the benefits of a hydrostatic drive at a low speed operating mode.

This object is achieved by a driveline in accordance with the independent claims. Special embodiments are described in the dependent claims.

Thus, a hydrostatic driveline according to a first embodiment of the present invention comprises:
 a power source;
 a hydrostatic pump in driving engagement with the power source;
 a primary driveline shaft in driving engagement with the power source;
 a first transmission portion;
 a second transmission portion in driving engagement with the first transmission portion;
 a hydrostatic motor in fluid communication with the hydrostatic pump and in driving engagement with the first transmission portion; and
 a vehicle output in driving engagement with the second transmission portion;
 wherein the primary driveline shaft is also in driving engagement with the second transmission portion and the hydrostatic driveline may be operated in a hydrostatic mode using the hydrostatic pump, the hydrostatic motor, the first transmission portion, and the second transmission portion or the hydrostatic driveline may be operated in a direct drive mode using the primary driveline shaft and the second transmission portion.

Further according to the first embodiment, the primary driveline shaft may include a first geared portion and a second geared portion, the first geared portion of the primary driveline shaft comprising a toothed, radially extending portion in driving engagement with the second transmission portion and with the hydrostatic pump. The second geared portion of the primary driveline shaft may likewise comprise a toothed, radially extending portion.

Further according to the first embodiment, the first transmission portion may include an input portion, a clutching device and an output portion. The clutching device of the first transmission portion may be configured to selectively drivingly engage the input portion of the first transmission portion with the output portion of the first transmission portion. The hydrostatic motor may include a geared output portion which may be drivingly engaged with the input portion of the first transmission portion. The output portion of the first transmission portion may be drivingly engaged with the second transmission portion, for example through an idle gear or through another type of mechanical connection.

Further according to the first embodiment, the second transmission portion may include a first direct input, a second direct input, a main portion drivingly engaged with the first transmission portion, a first clutching device, a second clutching device, and a drive output portion drivingly engaged with the vehicle output. The first clutching device may be configured to selectively drivingly engage the first direct input with the drive output portion. Similarly, the second clutching device may be configured to selectively drivingly engage the second direct input with the drive output portion.

Further according to the first embodiment, the first direct input and the first clutching device may be disposed about an axially extending portion of the main portion. Similarly, the second direct input and the second clutching device may be disposed about an axially extending portion of the main portion, for example opposite the first direct input. The first direct input may be a toothed, radially extending portion such as a gear, for example. The second direct input may likewise be a toothed, radially extending portion such as a gear, for example.

Further according to the first embodiment, the first geared portion of the primary driveline shaft may be drivingly engaged with the first direct input of the second transmission portion. Thus, the first geared portion of the primary driveline shaft, the first direct input, the first clutching device and the drive output portion of the second transmission portion may selectively form a first drivetrain between the primary driveline shaft and the vehicle output. Similarly, the second geared portion of the primary driveline shaft may be drivingly engaged with the second direct input of the second transmission portion. Thus, the second geared portion of the primary driveline shaft, the second direct input, the second clutching device and the drive output portion of the second transmission portion may selectively form a second drivetrain between the primary driveline shaft and the vehicle output.

A hydrostatic driveline according to a second embodiment of the present invention comprises:
a power source;
a hydrostatic pump in driving engagement with the power source;
a direct drive link in driving engagement with the power source;
a hydrostatic motor in fluid communication with the hydrostatic pump;
a driveline shaft in driving engagement with the hydrostatic motor;
a transmission portion in driving engagement with the driveline shaft;
a vehicle output shaft in driving engagement with the transmission portion; and
an output clutch in driving engagement with the direct drive link and the vehicle output, wherein the hydrostatic driveline may be operated in a hydrostatic mode using the hydrostatic pump, the hydrostatic motor, the driveline shaft, and the transmission portion or the hydrostatic driveline may be operated in a direct drive mode using the direct drive link and the output clutch.

Further according to the second embodiment, the driveline shaft may include an input portion drivingly engaged with the hydrostatic motor, a first geared output portion, and a second geared output portion.

Further according to the second embodiment, the transmission portion may include a first input, a second input, a first transmission clutch, a second transmission clutch, and a transmission output shaft in driving engagement with the vehicle output shaft. The first transmission clutch may be configured to selectively drivingly engage the first input with the transmission output shaft. Similarly, the second transmission clutch may be configured to selectively drivingly engage the second input with the transmission output shaft.

Further according to the second embodiment, the first input of the transmission portion may be in driving engagement with the first geared output portion of the driveline shaft. Thus, the first geared output portion of the driveline shaft, the first input of the transmission portion, the first transmission clutch and the transmission output shaft may selectively form a first drivetrain between the driveline shaft and the vehicle output shaft. Similarly, the second input of the transmission portion may be in driving engagement with the second geared output portion of the driveline shaft. Thus, the second geared output portion of the driveline shaft, the second input, the second transmission clutch and the transmission output shaft may selectively form a second drivetrain between the driveline shaft and the vehicle output shaft. A drive ratio provided by the first drivetrain between the driveline shaft and the vehicle output shaft may be different from the drive ratio provided by the second drivetrain between the driveline shaft and the vehicle output shaft.

Further according to the second embodiment, the direct drive link may include one or more gears rotatably mounted in a housing, for example. The driveline according to the second embodiment may further comprise a shaft joining the power source and the hydrostatic pump. This shaft may comprise a geared portion which is drivingly engaged with the direct drive link.

Further according to the second embodiment, the vehicle output shaft may be drivingly engaged with a portion of the first output clutch such that the first output clutch is configured to selectively drivingly engage the direct drive link with the vehicle output shaft.

In both the first and the second embodiment the hydrostatic pump and the hydrostatic motor may each comprise a first fluid port and a second fluid port, wherein the first fluid port of the hydrostatic pump is in fluid communication with the first fluid port of the hydrostatic motor and wherein the second fluid port of the hydrostatic pump is in fluid communication with the second fluid port of the hydrostatic motor. Both, the driveline according to the first embodiment and the driveline according to the second embodiment may then further comprise a bypass valve configured to selectively provide direct fluid communication between the first fluid port of the hydrostatic pump and the second fluid port of the hydrostatic pump and/or between the first fluid port of the hydrostatic motor and the second fluid port of the hydrostatic motor. The bypass valved is typically biased to a closed state in which the bypass valve does not provide direct fluid communication between the first and the second fluid port of the hydrostatic pump and/or of the hydrostatic motor.

Usually, the bypass valve is configured such that when it is actuated the pressure difference between the first and the second fluid port of the hydrostatic pump and/or the pressure difference between the first and the second fluid port of the hydrostatic motor vanishes so that no torque is transmitted through the hydrostatic circuit including the hydrostatic pump and the hydrostatic motor. In many situations the hydrostatic circuit may have to be set to a state of zero torque transmission before the hydrostatic motor is disengaged. For example, this may be the case when shifting the driveline from the hydrostatic drive mode to the direct drive mode.

In known hydrostatic drivelines the hydrostatic circuit including the hydrostatic pump and the hydrostatic motor may be set to a zero torque transmission state by setting the hydraulic displacement of the hydrostatic pump and/or of the hydrostatic motor to zero, for example by setting the swivel angle of the swashplate to zero. By contrast, using the presently proposed bypass valve configuration the state of zero torque transmission may be reached substantially faster than in known hydrostatic circuits, because the amount of time needed to open and to close the bypass valve is typically a lot shorter than the amount of time needed to alter the hydraulic displacement of the hydraulic pump or of the hydraulic motor. Therefore, the proposed bypass valve configuration has the advantage that a clutching device providing selective driving engagement between the hydrostatic motor and the vehicle output may be released even before the hydraulic displacement of the hydrostatic motor is set to zero.

BRIEF DESCRIPTION OF THE FIGURES

The above, as well as other advantages of the present invention will become readily apparent to those skilled in the art from the following detailed description when considered in the light of the accompanying drawings in which:

FIG. 4A is a schematic illustration of a bypass valve configured to selectively provide direct fluid communication between the fluid lines of a hydrostatic circuit of the driveline according to the first embodiment shown in FIG. 2; and FIG. 4B is a schematic illustration of a bypass valve configured to selectively provide direct fluid communication between the fluid lines of a hydrostatic circuit of the driveline according to the second embodiment shown in FIG. 3.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
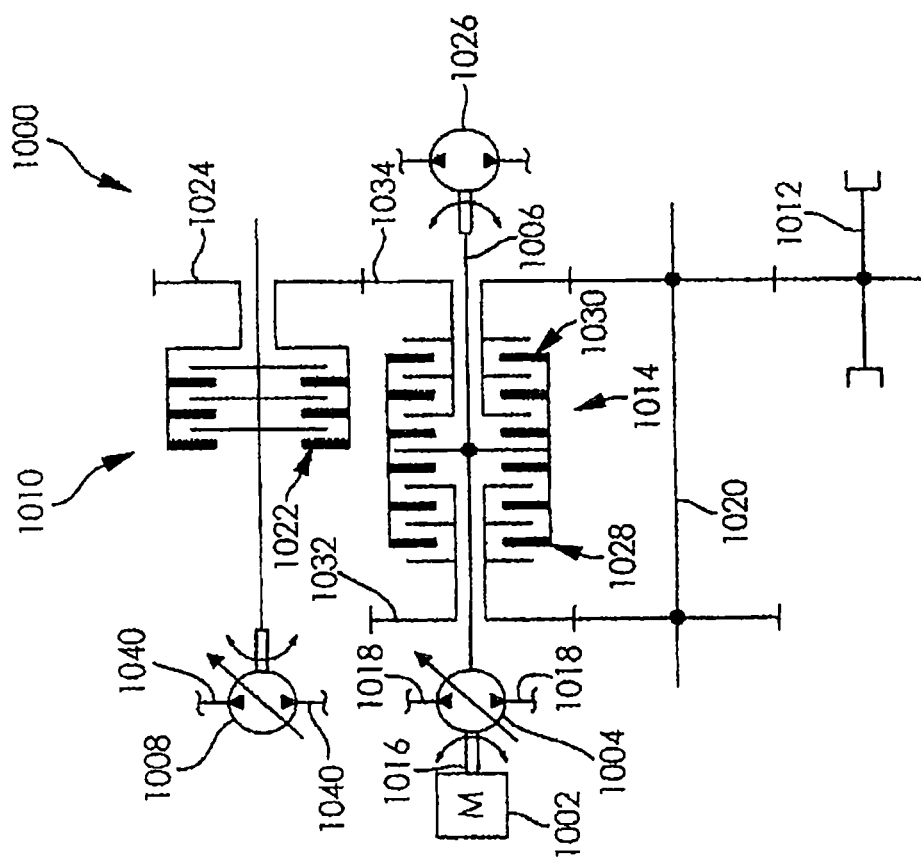
FIG. 1 is a schematic illustration of a hydrostatic driveline known in the prior art.
Figure 2:
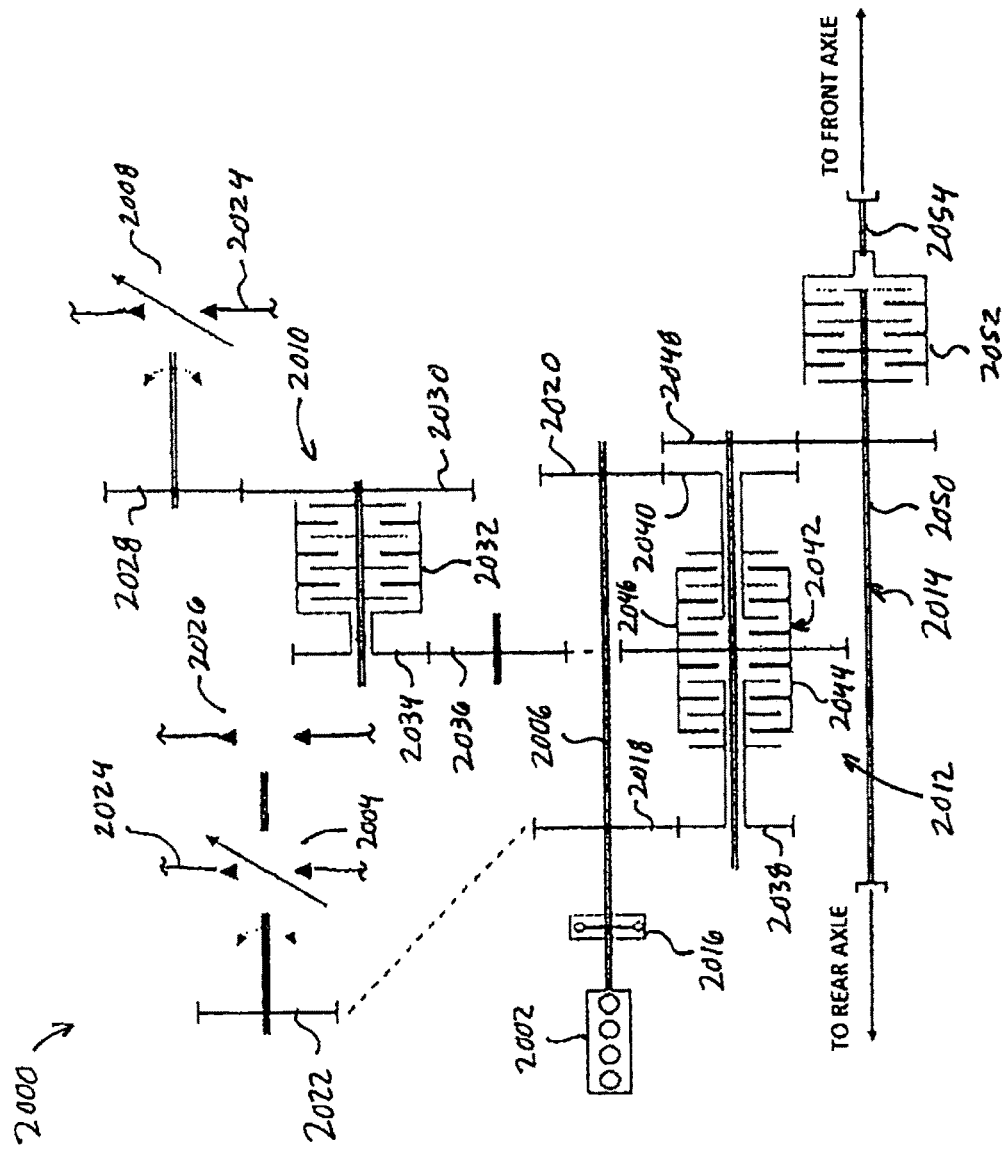
FIG. 2 is a schematic illustration of a hydrostatic driveline according to an embodiment of the present invention.

FIG. 2 illustrates a hydrostatic driveline 2000. The hydrostatic driveline 2000 includes a power source 2002 in driving engagement with a hydrostatic pump 2004 and a primary driveline shaft 2006. The hydrostatic pump 2004 is in fluid communication with a hydrostatic motor 2008. The hydrostatic motor 2008 is in driving engagement with a first transmission portion 2010, which is in driving engagement with a second transmission portion 2012. The primary driveline shaft 2006 is also in driving engagement with the second transmission portion 2012, which is in driving engagement with a vehicle output 2014. The hydrostatic driveline 2000 may be operated in a hydrostatic mode or a direct drive mode.

The power source 2002 applies power to the primary driveline shaft 2006 of the hydrostatic driveline 2000. The power source 2002 is, for example, an internal combustion engine; however, it is understood that the power source 2002 may include an electric motor or another source of rotational output. It is understood that the power source 2002 may be a hybrid power source including both an internal combustion engine and an electric motor. Further, it is understood that the power source 2002 may include an output ratio adjusting device as known in the art. As shown in FIG. 2, it is understood that the power source 2002 may include a torsional damper 2016 as known in the art, for reducing vibrations in power transfer from the power source 2002 to the primary driveline shaft 2006.

The primary driveline shaft 2006 is in driving engagement with the power source 2002, the first transmission portion 2010, and the second transmission portion 2012. The primary driveline shaft 2006 is a shaft rotatably mounted in a housing (not shown), however, the primary driveline shaft 2006 may also comprise a plurality of gears or another type of mechanical connection. The primary driveline shaft 2006 includes a first geared portion 2018 and a second geared portion 2020. The first geared portion 2018 is a toothed, radially extending portion of the primary driveline shaft 2006 in driving engagement with a portion of the second transmission portion 2012 and the hydrostatic pump 2004. The first geared portion 2018 is formed separate from and coupled to a remaining portion of the primary driveline shaft 2006 in any conventional manner, but it is understood that the primary driveline shaft 2006 may be unitarily formed. The second geared portion 2020 is a toothed, radially extending portion of the primary driveline shaft 2006 in driving engagement with a portion of the second transmission portion 2012. The second geared portion 2020 is formed separate from and coupled to a remaining portion of the primary driveline shaft 2006 in any conventional manner, but it is understood that the primary driveline shaft 2006 may be unitarily formed.

The hydrostatic pump 2004 is a hydraulic axial piston pump having a movable swashplate (not shown) which varies a displacement thereof. However, it is understood the hydrostatic pump 2004 may be any other type of variable displacement pump. The hydrostatic pump 2004 is drivingly engaged with the power source 2002 through the primary driveline shaft 2006 and a geared input portion 2022. The hydrostatic pump 2004 is in fluid communication with the hydrostatic motor 2008 through at least two fluid conduits 2024 (partially shown). As the hydrostatic pump 2004 is drivingly engaged with the power source 2002, the geared input portion 2022 of the hydrostatic pump 2004 always rotates in the same direction as the power source 2002. A direction of flow through the hydrostatic pump 2004 is changed by adjusting a swashplate angle of the hydrostatic pump 2004. By adjusting the swashplate angle of the hydrostatic pump 2004, a forward and a reverse direction is provided when the hydrostatic driveline 2000 is operated in the hydrostatic mode. An auxiliary pump 2026, which is a fixed displacement pump, which may be used to supplement a displacement of the hydrostatic pump 2004, is in driving engagement with a portion of the hydrostatic pump 2004.

The hydrostatic motor 2008 is a variable displacement hydraulic motor. However, it is understood the hydrostatic motor 2008 may be another type of hydraulic motor. The hydrostatic motor 2008 is drivingly engaged with the first transmission portion 2010 through a geared output portion 2028. As mentioned hereinabove, the hydrostatic motor 2008 is in fluid communication with the hydrostatic pump 2004 through the at least two fluid conduits 2024. In response to fluid flow from the hydrostatic pump 2004, the hydrostatic motor 2008 drives the first transmission portion 2010 through the geared output portion 2028.

The first transmission portion 2010 is a clutch and gear assembly drivingly engaged with the hydrostatic motor 2008 and the second transmission portion 2012. The first transmission portion 2010 includes an input portion 2030, a clutching device 2032, an output portion 2034, and an idler gear 2036. The input portion 2030, the output portion 2034, and the idler gear 2036 form a drivetrain between the hydrostatic motor 2008 and the second transmission portion 2012. It is understood that the components 2030, 2034, 2036 of the first transmission portion 2010 may be selected to adjust a drive ratio between the hydrostatic motor 2008 and the second transmission portion 2012. By engaging the clutching device 2032, the input portion 2030 becomes drivingly engaged with the output portion 2034. The clutching device 2032 is a plate style clutch, however, it is understood that the clutching device 2032 may be any type of clutch that may be variably engaged. As mentioned hereinabove, by adjusting the swashplate angle of the hydrostatic pump 2004, the first transmission portion 2010, and thus the vehicle output 2014, may be operated in a forward and a reverse direction. The first transmission portion 2010 is used when the hydrostatic driveline 2000 is operated in the hydrostatic mode.

The second transmission portion 2012 is a clutch and gear assembly drivingly engaged with the primary driveline shaft 2006, the first transmission portion 2010, and the vehicle output 2014. The second transmission portion 2012 includes a first direct input 2038, a second direct input 2040, a main portion 2042, a first clutching device 2044, a second clutching device 2046, and a drive output portion 2048. The first direct input 2038, the second direct input 2040, the main portion 2042, and the drive output portion 2048 form three drivetrains between the primary driveline shaft 2006 or the first transmission portion 2010 and the vehicle output 2014. It is understood that the components 2038, 2040, 2042, 2048 of the second transmission portion 2012 may be selected to adjust a drive ratio between the primary driveline shaft 2006 or the first transmission portion 2010 and the vehicle output 2014. The first clutching device 2044 and second clutching device 2046 of the second transmission portion 2012 are used when the hydrostatic driveline 2000 is operated in the direct drive mode.

The main portion 2042 includes a radially extending portion which is in driving engagement with the idler gear 2036. The drive output portion 2048 is formed separate from and coupled to the main portion 2042 in any conventional manner, but it is understood that the primary driveline shaft 2006 may be unitarily formed. The drive output portion 2048 is in driving engagement with the vehicle output 2014. The first direct input 2038 and the first clutching device 2044 are disposed about an axially extending portion of the main portion 2042. The second direct input 2040 and the second clutching device 2046 are disposed about an axially extending portion of the main portion 2042, opposite the first direct input 2038.

The first clutching device 2044 and the second clutching device 2046 are plate style clutches, however, it is understood that the clutching devices 2044, 2046 may be any type of clutch that may be variably engaged. By engaging the first clutching device 2044, the first direct input 2038 becomes drivingly engaged with the main portion 2042, and the hydrostatic driveline 2000 is placed in the direct drive mode. By engaging the second clutching device 2046, the second direct input 2040 becomes drivingly engaged with the main portion 2042, and the hydrostatic driveline 2000 is placed in the direct drive mode. It is understood that each of the drivetrains associated with the first clutching device 2044 and the second clutching device 2046 each have a different drive ratio.

The vehicle output 2014 is in driving engagement with the drive output portion 2048 of the second transmission portion 2012. The vehicle output 2014 is a shaft and clutch assembly rotatably mounted in a housing (not shown); however, the vehicle output 2014 may also comprise a plurality of gears or another type of mechanical connection. The vehicle output 2014 includes a first output portion 2050, an output clutch 2052, and a second output 2054. The first output portion 2050 is a shaft including a toothed, radially extending portion in driving engagement with drive output portion 2048 of the second transmission portion 2012. The toothed, radially extending portion is formed separate from and coupled to the first output portion 2050 in any conventional manner, but it is understood that the first output portion 2050 may be unitarily formed. The first output portion 2050 is in driving engagement with a rear axle assembly (not shown); however, it is understood that the first output portion 2050 may be in driving engagement with another axle assembly. The output clutch 2052 is a plate style clutch that facilitates at least variable driving engagement between the first output portion 2050 and the second output 2054. It is understood, however, that the clutching devices 2044, 2046 may be any type of clutch that may be variably engaged. The second output 2054 is a shaft in driving engagement with the output clutch 2052 and a front axle assembly (not shown). It is understood, however, that the first output portion 2050 may be in driving engagement with another axle assembly.

In use, the hydrostatic driveline 2000 may be operated in the hydrostatic mode or the direct drive mode. In either of the drive modes, only one of the clutching devices 2032, 2044, 2046 may be fully engaged at any given instant. In the hydrostatic mode, the clutching device 2032 is engaged and the hydrostatic driveline 2000 is operated at lower speeds using the first transmission portion 2010, the main portion 2042 of the second transmission portion 2012, and the vehicle output 2014. As mentioned hereinabove, by adjusting the swashplate angle of the hydrostatic pump 2004, the forward and the reverse direction is provided to the vehicle output 2014. In the direct drive mode, the hydrostatic driveline 2000 is operated at higher vehicle speeds in one of two ways. In a first way, the first clutching device 2044 is engaged and the hydrostatic driveline 2000 is operated using the first geared portion 2018, the first direct input 2038, the main portion 2042 of the second transmission portion 2012, and the vehicle output 2014. In a second way, the second clutching device 2046 is engaged and the hydrostatic driveline 2000 is operated using the second geared portion 2020, the second direct input 2040, the main portion 2042 of the second transmission portion 2012, and the vehicle output 2014.

Figure 3:
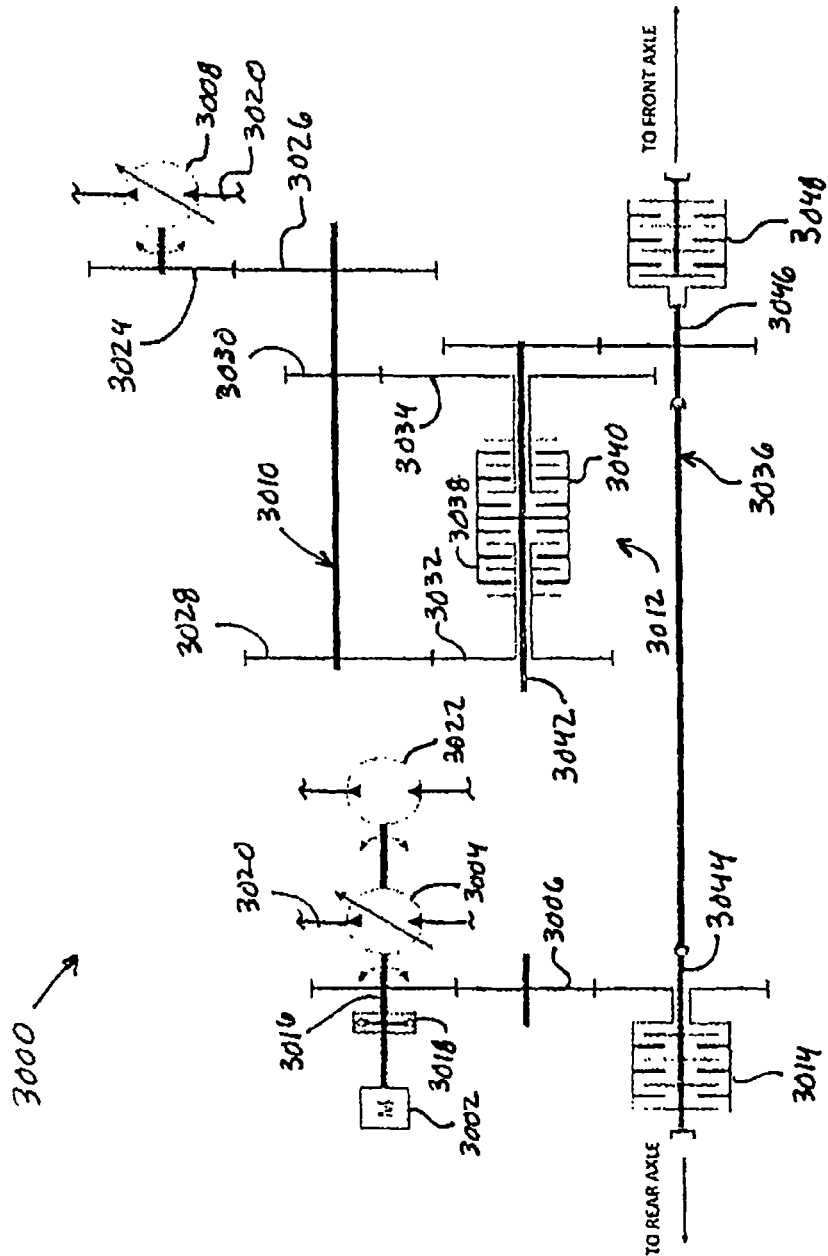
FIG. 3 is a schematic illustration of a hydrostatic driveline according to another embodiment of the present invention.

FIG. 3 illustrates a hydrostatic driveline 3000. The hydrostatic driveline 3000 includes a power source 3002 in driving engagement with a hydrostatic pump 3004 and a direct drive link 3006. The hydrostatic pump 3004 is in fluid communication with a hydrostatic motor 3008. The hydrostatic motor 3008 is in driving engagement with a driveline shaft 3010, which is in driving engagement with a transmission portion 3012. The direct drive link 3006 is in driving engagement with a first output clutch 3014. The hydrostatic driveline 3000 may be operated in a hydrostatic mode or a direct drive mode.

The power source 3002 applies power to the direct drive link 3006 and the hydrostatic pump 3004 through a shaft 3016 that joins the power source 3002 and the hydrostatic pump 3004. A portion of the shaft 3016 is geared to facilitate driving engagement with the direct drive link 3006; however, it is understood that other types of mechanical connections may be used. The power source 3002 is, for example, an internal combustion engine; however, it is understood that the power source 3002 may include an electric motor or another source of rotational output. It is understood that the power source 3002 may be a hybrid power source including both an internal combustion engine and an electric motor. Further, it is understood that the power source 3002 may include an output ratio adjusting device as known in the art. As shown in FIG. 3, it is understood that the power source 3002 may include a torsional damper 3018 as known in the art, for reducing vibration in power transfer from the power source 3002 to the direct drive link 3006 and the hydrostatic pump 3004.

The direct drive link 3006 is in driving engagement with the power source 3002 (through the radially extending portion of the shaft 3016) and the first output clutch 3014. The direct drive link 3006 is a gear rotatably mounted in a housing (not shown); however, the direct drive link 3006 may also comprise a plurality of gears or another type of mechanical connection.

The hydrostatic pump 3004 is a hydraulic axial piston pump having a movable swashplate (not shown) which varies a displacement thereof. However, it is understood the hydrostatic pump 3004 may be any other type of variable displacement pump. As mentioned hereinabove, the hydrostatic pump 3004 is drivingly engaged with the power source 3002 through the shaft 3016. The hydrostatic pump 3004 is in fluid communication with the hydrostatic motor 3008 through at least two fluid conduits 3020 (partially shown). As the hydrostatic pump 3004 is drivingly engaged with the power source 3002, the hydrostatic pump 3004 always rotates in the same direction as the power source 3002. A direction of flow through the hydrostatic pump 3004 is changed by adjusting a swashplate angle of the hydrostatic pump 3004. By adjusting the swashplate angle of the hydrostatic pump 3004, a forward and a reverse direction is provided when the hydrostatic driveline 3000 is operated in the hydrostatic mode. An auxiliary pump 3022, which is a fixed displacement pump, which may be used to supplement a displacement of the hydrostatic pump 3004, is in driving engagement with a portion of the hydrostatic pump 3004.

The hydrostatic motor 3008 is a variable displacement hydraulic motor. However, it is understood the hydrostatic motor 3008 may be another type of hydraulic motor. The hydrostatic motor 3008 is drivingly engaged with the driveline shaft 3010. As mentioned hereinabove, the hydrostatic motor 3008 is in fluid communication with the hydrostatic pump 3004 through the at least two fluid conduits 3020. In response to fluid flow from the hydrostatic pump 3004, the hydrostatic motor 3008 drives the driveline shaft 3010 through a geared output portion 3024.

The driveline shaft 3010 is in driving engagement with the hydrostatic motor 3008 and the transmission portion 3012. The driveline shaft 3010 is a shaft rotatably mounted in a housing (not shown); however, the driveline shaft 3010 may also comprise a plurality of gears or another type of mechanical connection. The driveline shaft 3010 includes an input portion 3026, a first geared output portion 3028, and a second geared output portion 3030. The input portion 3026 is a toothed, radially extending portion of the driveline shaft 3010 in driving engagement with the geared output portion 3024 of the hydrostatic motor 3008. The input portion 3026 is formed separate from and coupled to a remaining portion of the driveline shaft 3010 in any conventional manner, but it is understood that the driveline shaft 3010 may be unitarily formed. The first geared output portion 3028 is a toothed, radially extending portion of the driveline shaft 3010 in driving engagement with a first input 3032 of the transmission portion 3012. The first geared output portion 3028 is formed separate from and coupled to a remaining portion of the driveline shaft 3010 in any conventional manner, but it is understood that the driveline shaft 3010 may be unitarily formed. The second geared output portion 3030 is a toothed, radially extending portion of the driveline shaft 3010 in driving engagement with a second input 3034 of the transmission portion 3012. The second geared output portion 3030 is formed separate from and coupled to a remaining portion of the driveline shaft 3010 in any conventional manner, but it is understood that the driveline shaft 3010 may be unitarily formed.

The transmission portion 3012 is a clutch and gear assembly drivingly engaged with the driveline shaft 3010 and a vehicle output shaft 3036. The transmission portion 3012 includes the first input 3032, the second input 3034, a first transmission clutch 3038, a second transmission clutch 3040, and a transmission output shaft 3042. The first input 3032, the second input 3034, the first transmission clutch 3038, the second transmission clutch 3040, and the transmission output shaft 3042 form two drivetrains between the driveline shaft 3010 and the vehicle output shaft 3036. It is understood that the components 3032, 3034, 3038, 3040, 3042 of the transmission portion 3012 may be selected to adjust a drive ratio between the driveline shaft 3010 and the vehicle output shaft 3036. The first transmission clutch 3038 and the second transmission clutch 3040 of the transmission portion 3012 are used when the hydrostatic driveline 3000 is operated in the hydrostatic drive mode.

The transmission output shaft 3042 includes a radially extending portion which is in driving engagement with vehicle output shaft 3036. The transmission output shaft 3042 includes a portion of both the first transmission clutch 3038 and the second transmission clutch 3040. A remaining portion of each of the first transmission clutch 3038 and the second transmission clutch 3040 are respectively drivingly engaged with the first input 3032 and the second input 3034.

The first transmission clutch 3038 and the second transmission clutch 3040 are plate style clutches, however, it is understood that the clutching devices 3038, 3040 may be any type of clutch that may be variably engaged. By engaging the first transmission clutch 3038, the first input 3032 becomes drivingly engaged with the transmission output shaft 3042. By engaging the second transmission clutch 3040, the second input 3034 becomes drivingly engaged with the transmission output shaft 3042. It is understood that each of the drivetrains associated with the first transmission clutch 3038 and the second transmission clutch 3040 each have a different drive ratio.

The vehicle output shaft 3036 is in driving engagement with the transmission output shaft 3042 and a rear axle assembly (not shown). It is understood, however, that the vehicle output shaft 3036 may be in driving engagement with another axle assembly. The vehicle output shaft 3036 is a shaft assembly rotatably mounted in a housing (not shown); however, the vehicle output shaft 3036 may also comprise a plurality of gears or another type of mechanical connection. The vehicle output shaft 3036 includes a toothed, radially extending portion in driving engagement with the transmission output shaft 3042. The vehicle output shaft 3036 also includes a first end 3044 and a second end 3046. The first end 3044 of the vehicle output shaft 3036 is drivingly engaged with a portion of the first output clutch 3014. The second end 3046 of the vehicle output shaft 3036 is drivingly engaged with a portion of a second output clutch 3048.

When the first output clutch 3014 is engaged, the direct drive link 3006 is drivingly engaged with the vehicle output shaft 3036 and the rear axle assembly. When the second output clutch 3048 is engaged, the vehicle output shaft 3036 is drivingly engaged with a front axle assembly (not shown); however, it is understood that the vehicle output shaft 3036 may be in driving engagement with another axle assembly. The first output clutch 3014 and the second output clutch 3048 are plate style clutches, however, it is understood that the clutching devices 3014, 3048 may be any type of clutch that may be variably engaged.

In use, the hydrostatic driveline 3000 may be operated in the hydrostatic mode or the direct drive mode. In either of the drive modes, only one of the clutching devices 3014, 3038, 3040 may be fully engaged at any given instant. In the hydrostatic mode, one of the transmission clutches 3038, 3040 is engaged and the hydrostatic driveline 3000 is operated at lower speeds using the driveline shaft 3010, the transmission portion 3012, and the vehicle output shaft 3036. By engaging the second output clutch 3048, the hydrostatic driveline 3000 drives the front axle assembly in addition to the rear axle assembly in the hydrostatic mode. As mentioned hereinabove, by adjusting the swashplate angle of the hydrostatic pump 3004, the forward and the reverse direction is provided to the vehicle output shaft 3036. In the direct drive mode, the hydrostatic driveline 3000 is operated at higher speeds through engagement of the first output clutch 3014, through the direct drive link 3006. By engaging the second output clutch 3048, the hydrostatic driveline 3000 drives the front axle assembly in addition to the rear axle assembly in the direct drive mode.

FIG. 4A is a detailed illustration of the hydrostatic pump 2004 and the hydrostatic motor 2008 of the driveline 2000 depicted in FIG. 2. A first fluid port 2004a of the hydrostatic pump 2004 and a first fluid port 2008a of the hydrostatic motor 2008 are in fluid communication through a first fluid conduit 2024a. A second fluid port 2004b of the hydrostatic pump 2004 and a second fluid port 2008b of the hydrostatic motor 2008 are in fluid communication through a second fluid conduit 2024b. Thus, the hydrostatic pump 2004, the hydrostatic motor 2008 and the fluid conduits 2024a, 2024b form a closed hydrostatic circuit 2070 through which torque may be transmitted between the hydrostatic pump 2004 and the hydrostatic motor 2008.

Additionally, the hydrostatic circuit 2070 comprises a bypass valve 2060 configured to selectively provide direct fluid communication between the first fluid conduit 2024a and the second fluid conduit 2024b. The bypass valve 2060 may be switched at least between a closed state (shown in FIG. 4A) and an open state. When the bypass valve 2060 is in the closed state, a flow of hydraulic fluid between the first fluid conduit 2024a and the second fluid conduit 2024b through the bypass valve 2060 is blocked. When the bypass valve 2060 is in the open state, the bypass valve 2060 provides direct fluid communication between the fluid conduits 2024a, 2024b so that a pressure difference between the fluid conduits 2024a, 2024b vanishes and no torque is transferred through the hydrostatic circuit 2070. The bypass valve 2060 may be biased to the closed state. The bypass valve 2060 enables particularly fast switching between the hydrostatic drive mode and the direct drive mode.

FIG. 4B is a detailed illustration of the hydrostatic pump 3004 and the hydrostatic motor 3008 of the driveline 3000 depicted in FIG. 3. A first fluid port 3004a of the hydrostatic pump 3004 and a first fluid port 3008a of the hydrostatic motor 3008 are in fluid communication through a first fluid conduit 3020a. A second fluid port 3004b of the hydrostatic pump 3004 and a second fluid port 3008b of the hydrostatic motor 3008 are in fluid communication through a second fluid conduit 3020b. Thus, the hydrostatic pump 3004, the hydrostatic motor 3008 and the fluid conduits 3020a, 3020b form a closed hydrostatic circuit 3070 through which torque may be transmitted between the hydrostatic pump 3004 and the hydrostatic motor 3008.

Additionally, the hydrostatic circuit 3070 comprises a bypass valve 3060 configured to selectively provide direct fluid communication between the first fluid conduit 3020a and the second fluid conduit 3020b. The bypass valve 3060 may be switched at least between a closed state (shown in FIG. 4B) and an open state. When the bypass valve 3060 is in the closed state, a flow of hydraulic fluid between the first fluid conduit 3020a and the second fluid conduit 3020b through the bypass valve 3060 is blocked. When the bypass valve 3060 is in the open state, the bypass valve 3060 provides direct fluid communication between the fluid conduits 3020a, 3020b so that a pressure difference between the fluid conduits 3020a, 3020b vanishes and no torque is transferred through the hydrostatic circuit 3070. The bypass valve 3060 may be biased to the closed state. The bypass valve 3060 enables particularly fast switching between the hydrostatic drive mode and the direct drive mode.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A hydrostatic driveline, comprising:
a power source;
a hydrostatic pump in driving engagement with the power source;
a primary driveline shaft in driving engagement with the power source;
a first transmission portion;
a second transmission portion in driving engagement with the first transmission portion;
a hydrostatic motor in fluid communication with the hydrostatic pump and in driving engagement with the first transmission portion; and
a vehicle output in driving engagement with the second transmission portion;
wherein the second transmission portion includes a first direct input, a second direct input, a main portion drivingly engaged with the first transmission portion, a first clutching device, a second clutching device, and a drive output portion drivingly engaged with the vehicle output, wherein the first clutching device is configured to selectively drivingly engage the first direct input with the drive output portion and wherein the second clutching device is configured to selectively drivingly engage the second direct input with the drive output portion; and
wherein the primary driveline shaft is also in driving engagement with the second transmission portion and the hydrostatic driveline may be selectively operated in either one of
a. a hydrostatic mode using the hydrostatic pump, the hydrostatic motor, the first transmission portion, and the second transmission portion, and
b. a direct drive mode using the primary driveline shaft and the second transmission portion.

2. The hydrostatic driveline according to claim 1, wherein the primary driveline shaft includes a first geared portion and a second geared portion, the first geared portion of the primary driveline shaft comprising a toothed, radially extending portion in driving engagement with the second transmission portion and with the hydrostatic pump.

3. The hydrostatic driveline according to claim 1, wherein the first transmission portion includes an input portion, a clutching device and an output portion, the clutching device of the first transmission portion configured to drivingly engage the input portion of the first transmission portion with the output portion of the first transmission portion, wherein a geared output portion of the hydrostatic motor is drivingly engaged with the input portion of the first transmission portion and wherein the output portion of the first transmission portion is drivingly engaged with the second transmission portion.

4. The hydrostatic driveline according to claim 1, wherein the first direct input and the first clutching device are disposed about an axially extending portion of the main portion, and wherein the second direct input and the second clutching device are disposed about an axially extending portion of the main portion, opposite the first direct input.

5. The hydrostatic driveline according to claim 4, wherein the first geared portion of the primary driveline shaft is drivingly engaged with the first direct input of the second transmission portion and wherein the second geared portion of the primary driveline shaft is drivingly engaged with the second direct input of the second transmission portion.

6. A hydrostatic driveline, comprising:
- a power source;
- a hydrostatic pump in driving engagement with the power source;
- a direct drive link in driving engagement with the power source;
- a hydrostatic motor in fluid communication with the hydrostatic pump;
- a driveline shaft in driving engagement with the hydrostatic motor, wherein the driveline shaft includes an input portion drivingly engaged with the hydrostatic motor, a first geared output portion, and a second geared output portion;
- a transmission portion in driving engagement with the driveline shaft;
- a vehicle output shaft in driving engagement with the transmission portion; and
- an output clutch in driving engagement with the direct drive link and the vehicle output;
- wherein the hydrostatic driveline may be selectively operated in either one of
  a. a hydrostatic mode using the hydrostatic pump, the hydrostatic motor, the driveline shaft, and the transmission portion, and
  b. a direct drive mode using the direct drive link and the output clutch.

7. The hydrostatic driveline according to claim 6, wherein the transmission portion includes a first input, a second input, a first transmission clutch, a second transmission clutch, and a transmission output shaft in driving engagement with the vehicle output shaft, wherein the first transmission clutch is configured to selectively drivingly engage the first input with the transmission output shaft and wherein the second transmission clutch is configured to selectively drivingly engage the second input with the transmission output shaft.

8. The hydrostatic driveline according to claim 7, wherein the first input of the transmission portion is in driving engagement with the first geared output portion of the driveline shaft and wherein the second input of the transmission portion is in driving engagement with the second geared output portion of the driveline shaft.

9. The hydrostatic driveline according to claim 8, further comprising a shaft joining the power source and the hydrostatic pump, wherein a geared portion of the shaft joining the power source and the hydrostatic pump is drivingly engaged with the direct drive link.

10. The hydrostatic driveline according to claim 9, wherein the vehicle output shaft is drivingly engaged with a portion of the first output clutch such that the first output clutch is configured to selectively drivingly engage the direct drive link with the vehicle output shaft.

11. The hydrostatic driveline according to claim 10, wherein the direct drive link includes one or more gears rotatably mounted in a housing.

12. The hydrostatic driveline according to claim 11, wherein a first fluid port of the hydrostatic pump is in fluid communication with a first fluid port of the hydrostatic motor and wherein a second fluid port of the hydrostatic pump is in fluid, communication with a second fluid port of the hydrostatic motor , the driveline further comprising a bypass valve configured to selectively directly fluidly connect the first fluid port of the hydrostatic pump with the second fluid port of the hydrostatic pump and/or the bypass valve configured to selectively directly fluidly connect the first fluid port of the hydrostatic motor with the second fluid port of the hydrostatic motor.

* * * * *

UNITED STATES PATENT AND TRADEMARK OFFICE
CERTIFICATE OF CORRECTION

PATENT NO. : 10,364,886 B2
APPLICATION NO. : 15/557857
DATED : July 30, 2019
INVENTOR(S) : Andrea Bortoli et al.

It is certified that error appears in the above-identified patent and that said Letters Patent is hereby corrected as shown below:

In the Claims

Claim 12, Column 14, Line 39, delete "," between fluid and communication.

Signed and Sealed this
Twelfth Day of November, 2019

Andrei Iancu
*Director of the United States Patent and Trademark Office*